United States Patent
Balan et al.

(10) Patent No.: US 7,392,181 B2
(45) Date of Patent: Jun. 24, 2008

(54) SYSTEM AND METHOD FOR NONLINEAR SIGNAL ENHANCEMENT THAT BYPASSES A NOISY PHASE OF A SIGNAL

(75) Inventors: Radu Victor Balan, West Windsor, NJ (US); Justinian Rosca, West Windsor, NJ (US); Peter Casazza, Columbia, MO (US); Dan Edidin, Columbia, MO (US)

(73) Assignee: Siemens Corporate Research, Inc., Princeton, NJ (US)

( * ) Notice: Subject to any disclaimer, the term of this patent is extended or adjusted under 35 U.S.C. 154(b) by 735 days.

(21) Appl. No.: 11/070,612

(22) Filed: Mar. 2, 2005

(65) Prior Publication Data

US 2005/0196065 A1    Sep. 8, 2005

Related U.S. Application Data

(60) Provisional application No. 60/550,751, filed on Mar. 5, 2004.

(51) Int. Cl.
*G10L 21/02* (2006.01)
(52) U.S. Cl. ...................................................... 704/226
(58) Field of Classification Search .................. 704/226
See application file for complete search history.

(56) References Cited

U.S. PATENT DOCUMENTS

| | | | |
|---|---|---|---|
| 6,343,268 B1 * | 1/2002 | Balan et al. | 704/228 |
| 6,952,482 B2 * | 10/2005 | Balan et al. | 381/94.1 |
| 7,088,831 B2 * | 8/2006 | Rosca et al. | 381/92 |
| 7,149,691 B2 * | 12/2006 | Balan et al. | 704/270 |
| 7,158,933 B2 * | 1/2007 | Balan et al. | 704/226 |
| 7,266,303 B2 * | 9/2007 | Linden et al. | 398/140 |

* cited by examiner

*Primary Examiner*—Susan McFadden (57) ABSTRACT

A system and method for nonlinear signal enhancement is provided. The method comprises: performing a linear transformation on a measured signal comprising a source component and a noise component; determining a modulus of the linear transformed signal; estimating a noise-free part of the linear transformed signal; and reconstructing the source component of the measured signal using the noise-free part of the linear transformed signal.

20 Claims, 3 Drawing Sheets

SYSTEM AND METHOD FOR NONLINEAR SIGNAL ENHANCEMENT THAT BYPASSES A NOISY PHASE OF A SIGNAL

CROSS-REFERENCE TO RELATED APPLICATION

This application claims the benefit of U.S. Provisional Application No. 60/550,751, filed Mar. 5, 2004, a copy of which is herein incorporated by reference.

BACKGROUND OF THE INVENTION

1. Technical Field

The present invention relates to signal enhancement, and more particularly, to a system and method for nonlinear signal enhancement that does not use a noisy phase of a signal.

2. Discussion of the Related Art

Current signal enhancement techniques are directed to suppressing noise and improving the perceptual quality of a signal of interest. For example, by using signal enhancement algorithms, signal enhancement techniques can remove unwanted noise and interference found in speech and other audio signals while minimizing degradation to the signal of interest. Similarly, image enhancement techniques aim to improve the quality of a picture for viewing. In both cases, however, there is room for improvement due to the random nature of noise and the inherent complexities involved in speech and signal recognition.

Figure 1:
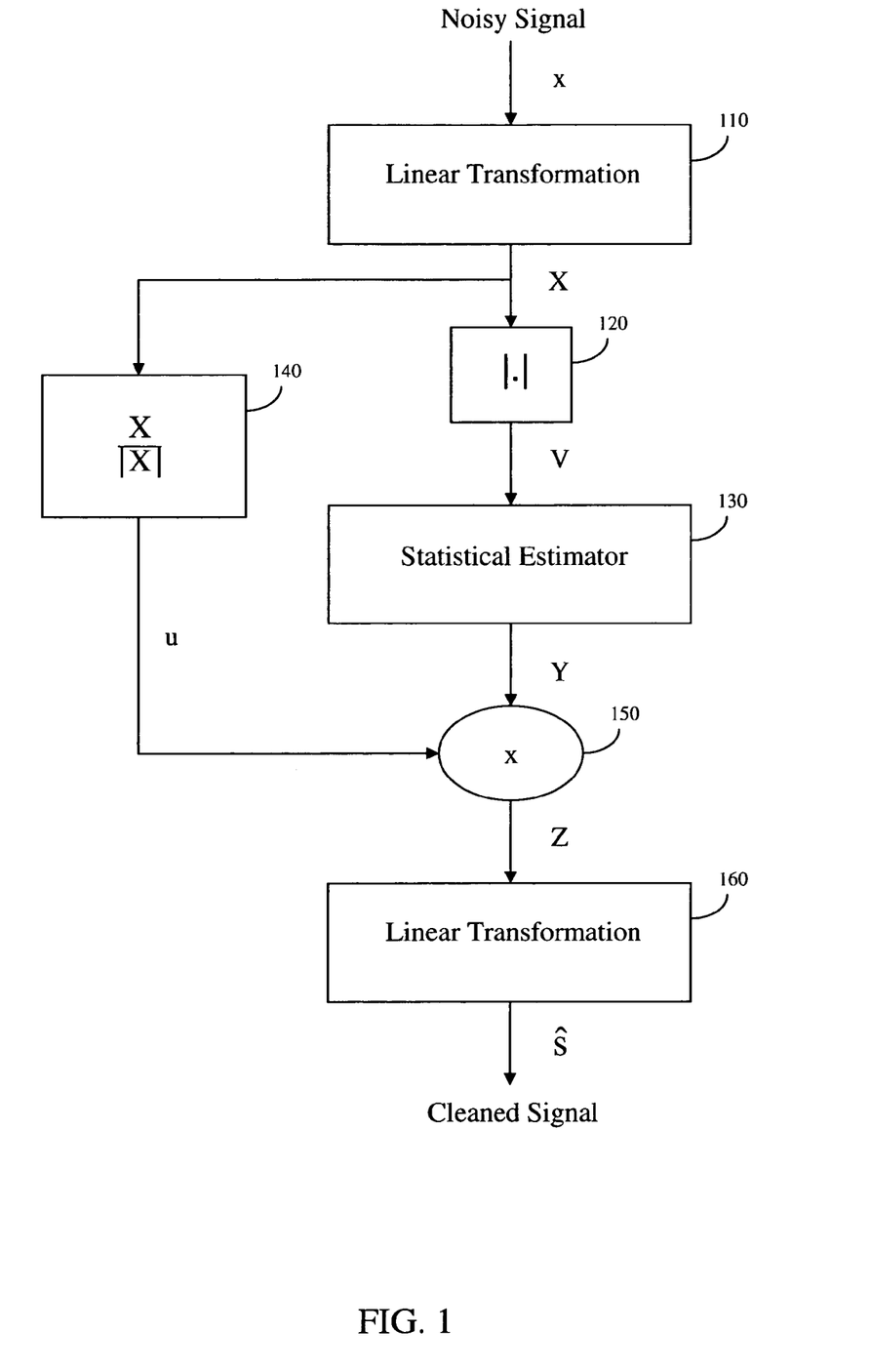
FIG. 1 is a flowchart illustrating a conventional signal enhancement method.

Current signal enhancement techniques follow the approach shown, for example, in FIG. 1. As shown in FIG. 1, a linear transformation such as a Fourier transform is applied to a noisy signal giving a representation of the signal in the transformed domain (110). The modulus or absolute value of the transformed signal is then determined (120) and a statistical estimate of a noise free part of the signal is computed (130). As the statistical estimate is being computed, the phase of the transformed signal is found (140). The product of the statistical estimate and the phase of the transformed signal is then determined (150) and an inverse linear transform is applied to the product to invert the product back into its original domain (160), thus resulting in a cleaned version of the signal.

Such algorithms have been shown to yield significant improvements for large classes of signals. However, recent psychoacoustic studies have shown that signal quality is very dependent on phase estimation. For example, if one takes a speech signal, performs a Linear Predictive Coding analysis and uses random white noise for excitation, the reconstructed signal in the time domain sounds very machine-made. Yet, if one uses custom excitation signals, the signal quality improves dramatically; however, this technique requires an estimate of the signal phase.

In order to enhance signal quality, information loss that results when taking the modulus of a signal has been considered. For example, in optics-based applications, a discrete signal may be reconstructed from the modulus of its Fourier transform under constraints in both the original and Fourier domain. For finite signals, the approach uses the Fourier transform with redundancy, and all signals having the same modulus of the Fourier transform satisfy a polynomial factorization. Thus, in one dimension, this factorization has an exponential number of possible solutions and in higher dimensions, the factorization is shown to have a unique solution.

Accordingly, there is a need for a technique of accurately reconstructing a signal without using its noisy phase or estimation and that takes into account information loss of the modulus of the signal.

SUMMARY OF THE INVENTION

The present invention overcomes the foregoing and other problems encountered in the known teachings by providing a system and method for nonlinear signal enhancement that bypasses a noisy phase of a signal.

In one embodiment of the present invention, a method for nonlinear signal enhancement, comprises: performing a linear transformation on a measured signal comprising a source component and a noise component; determining a modulus of the linear transformed signal; estimating a noise-free part of the linear transformed signal; and reconstructing the source component of the measured signal using the noise-free part of the linear transformed signal.

The step of reconstructing the source component of the measured signal, comprises: performing a nonlinear transformation on the noise-free part of the linear transformed signal; determining a sign of the source component of the measured signal; determining a product of the nonlinear transformed signal and the sign; and performing an overlap-add procedure using the product of the nonlinear transformed signal and the sign.

The linear transformation is one of a Fourier transform and a wavelet transform. The noise-free part of the linear transformed signal is estimated using one of a Wiener filtering technique and an Ephraim-Malah estimation technique.

The noise-free part of the linear transformed signal is estimated by solving:

$$Y(k,\omega) = \begin{cases} |X(k,\omega)| - \sqrt{R_n(k,\omega)} & \text{if } |X(k,\omega)|^2 \geq R_n(k,\omega) \\ 0 & \text{if otherwise} \end{cases}, \text{where}$$

$R_n(k,\omega) = \min_{k-W \leq k' \leq k} R_x(k',\omega)$, and $R_x(k,\omega) = (1-\beta)R_x(k-1,\omega) + \beta|X(k,\omega)|^2$.

The step of reconstructing the source component of the measured signal comprises: defining a three layer neural network by:

$$q_k = \sigma\left(\sum_{f=1}^{F} a_{kf} Z_f + \theta_k\right), 1 \leq k \leq L, \text{ and}$$

$$z_m = \sigma\left(\sum_{k=1}^{L} b_{mk} q_k + \tau_m\right), 1 \leq m \leq M;$$

performing a nonlinear transformation on the noise-free part of the linear transformed signal by solving:

$$u_m = z_m \sqrt{\frac{Y_1^2 + \ldots + Y_F^2}{z_1^2 + \ldots + z_M^2}};$$

determining a sign of the source component of the measured signal by solving:

$$\rho = \begin{cases} +1 & \text{if } \left\|\sum_{k=1}^{M} |x_k| - |u_k|\right\|^2 \le \left\|\sum_{k=1}^{M} |x_k| + |u_k|\right\|^2 \\ -1 & \text{if otherwise} \end{cases};$$

determining a product of the nonlinear transformed signal and the sign; and performing an overlap-add procedure using the product of the nonlinear transformed signal and the sign.

The method further comprises iterating:

$$\pi^{t+1} = \pi^t - \alpha \frac{\partial}{\partial \pi} \sum_{m=1}^{M} |u_m - s_m|^2,$$

until $\pi$ converges, wherein $\pi=(A, B, \theta, \tau)$. The noise-free part of the linear transformed signal is estimated by solving:

$$\min_{0 \le \alpha_k < 2\pi, 2 \le k \le F} \sum_{k=1}^{F} |Y'_k - TU(Y'))k|^2, \ Y' = (e^{j\alpha_k} Y_k)_{1 \le k \le F}, \ \alpha_1 = 0;$$

and the step of reconstructing the source component of the measured signal comprises: performing a nonlinear transformation on the noise-free part of the linear transformed signal by solving:

$$z = U(Y^O), \ Y_k^O = e^{j\alpha_k^O} Y_k;$$

determining a sign of the source component of the measured signal by solving:

$$\rho = \begin{cases} +1 & \text{if } \left\|\sum_{k=1}^{M} |x_k| - |u_k|\right\|^2 \le \left\|\sum_{k=1}^{M} |x_k| + |u_k|\right\|^2 \\ -1 & \text{if otherwise} \end{cases};$$

determining a product of the nonlinear transformed signal and the sign; and performing an overlap-add procedure using the product of the nonlinear transformed signal and the sign.

The step of reconstructing the source component of the measured signal comprises: (i) setting $k=0$, $Y_0=Y$; (ii) computing $z_k=UY_k$; (iii) computing $W=Tz_k$; (iv) computing $Y_0$ using:

$$Y_{k+1}(n) = Y(n) \frac{W(n)}{|W(n)|}, \ n = 1, 2, \ldots, F, \text{ wherein if } \|Y_k - Y_{k+1}\| > \varepsilon;$$

incrementing $k=k+1$, repeating steps (i-iv); and estimating the source component of the measured signal using $z_k$. The method further comprises outputting the reconstructed source component of the measured signal.

In another embodiment of the present invention, a system for nonlinear signal enhancement, comprises: a memory device for storing a program; a processor in communication with the memory device, the processor operative with the program to: perform a linear transformation on a measured signal comprising a source component and a noise component; determine a modulus of the linear transformed signal; estimate a noise-free part of the linear transformed signal; and reconstruct the source component of the measured signal using the noise-free part of the linear transformed signal When the source component of the measured signal is reconstructed the processor is further operative with the program code to: perform a nonlinear transformation on the noise-free part of the linear transformed signal; determine a sign of the source component of the measured signal; determine a product of the nonlinear transformed signal and the sign; and perform an overlap-add procedure using the product of the nonlinear transformed signal and the sign. The measured signal is received using one of a microphone and a database comprising one of audio signals and image signals.

When the source component of the measured signal is reconstructed the processor is further operative with the program code to: define a three layer neural network by:

$$q_k = \sigma\left(\sum_{f=1}^{F} a_{kf} Z_f + \theta_k\right), \ 1 \le k \le L, \text{ and}$$

$$z_m = \sigma\left(\sum_{k=1}^{L} b_{mk} q_k + \tau_m\right), \ 1 \le m \le M;$$

perform a nonlinear transformation on the noise-free part of the linear transformed signal by solving:

$$u_m = z_m \sqrt{\frac{Y_1^2 + \ldots + Y_F^2}{z_1^2 + \ldots + z_M^2}};$$

determine a sign of the source component of the measured signal by solving:

$$\rho = \begin{cases} +1 & \text{if } \left\|\sum_{k=1}^{M} |x_k| - |u_k|\right\|^2 \le \left\|\sum_{k=1}^{M} |x_k| + |u_k|\right\|^2 \\ -1 & \text{if otherwise} \end{cases};$$

determine a product of the nonlinear transformed signal and the sign; and perform an overlap-add procedure using the product of the nonlinear transformed signal and the sign.

The noise-free part of the linear transformed signal is estimated by solving:

$$\min_{0 \le \alpha_k < 2\pi, 2 \le k \le F} \sum_{k=1}^{F} |Y'_k - TU(Y'))k|^2, \ Y' = (e^{j\alpha_k} Y_k)_{1 \le k \le F}, \ \alpha_1 = 0;$$

and when the source component of the measured signal is reconstructed the processor is further operative with the program code to: perform a nonlinear transformation on the noise-free part of the linear transformed signal by solving:

$$z = U(Y^O), \ Y_k^O = e^{j\alpha_k^O} Y_k;$$

determine a sign of the source component of the measured signal by solving:

$$\rho = \begin{cases} +1 & \text{if } \sum_{k=1}^{M} \||x_k| - |u_k|\|^2 \leq \sum_{k=1}^{M} \||x_k| + |u_k|\|^2 \\ -1 & \text{if otherwise} \end{cases};$$

determine a product of the nonlinear transformed signal and the sign; and perform an overlap-add procedure using the product of the nonlinear transformed signal and the sign.

When the source component of the measured signal is reconstructed the processor is further operative with the program code to: (i) set k=0, $Y_0$=Y; (ii) compute $z_k$=$UY_k$; (iii) compute W=$Tz_k$; (iv) compute $Y_0$ using:

$$Y_{k+1}(n) = Y(n) \frac{W(n)}{|W(n)|}, n = 1, 2, \ldots, F, \text{ wherein if } \|Y_k - Y_{k+1}\| > \varepsilon:$$

increment k=k+1, repeat steps (i-iv); and estimate the source component of the measured signal using $Z_k$.

The processor is further operative with the program code to output the reconstructed source component of the measured signal. The reconstructed source component of the measured signal is output to one of a loudspeaker and an automatic speech recognition system.

In yet another embodiment of the present invention, a method for nonlinear signal enhancement, comprises: receiving a signal comprising a source component and a noise component; performing a linear transformation on the received signal; determining an absolute value of the linear transformed signal; estimating a noise-free part of the linear transformed signal; performing a nonlinear transformation on the noise-free part of the linear transformed signal; determining a sign of the source component of the received signal; determining a product of the nonlinear transformed signal and the sign; and performing an overlap-add procedure on the product of the nonlinear transformed signal and the sign to form a reconstructed signal of the source component of the received signal, wherein the reconstructed signal does not comprise the noise component of the received signal; and outputting the reconstructed signal. The received signal is one of a speech signal and an image signal.

The foregoing features are of representative embodiments and are presented to assist in understanding the invention. It should be understood that they are not intended to be considered limitations on the invention as defined by the claims, or limitations on equivalents to the claims. Therefore, this summary of features should not be considered dispositive in determining equivalents. Additional features of the invention will become apparent in the following description, from the drawings and from the claims.

DETAILED DESCRIPTION OF EXEMPLARY EMBODIMENTS

Figure 2:
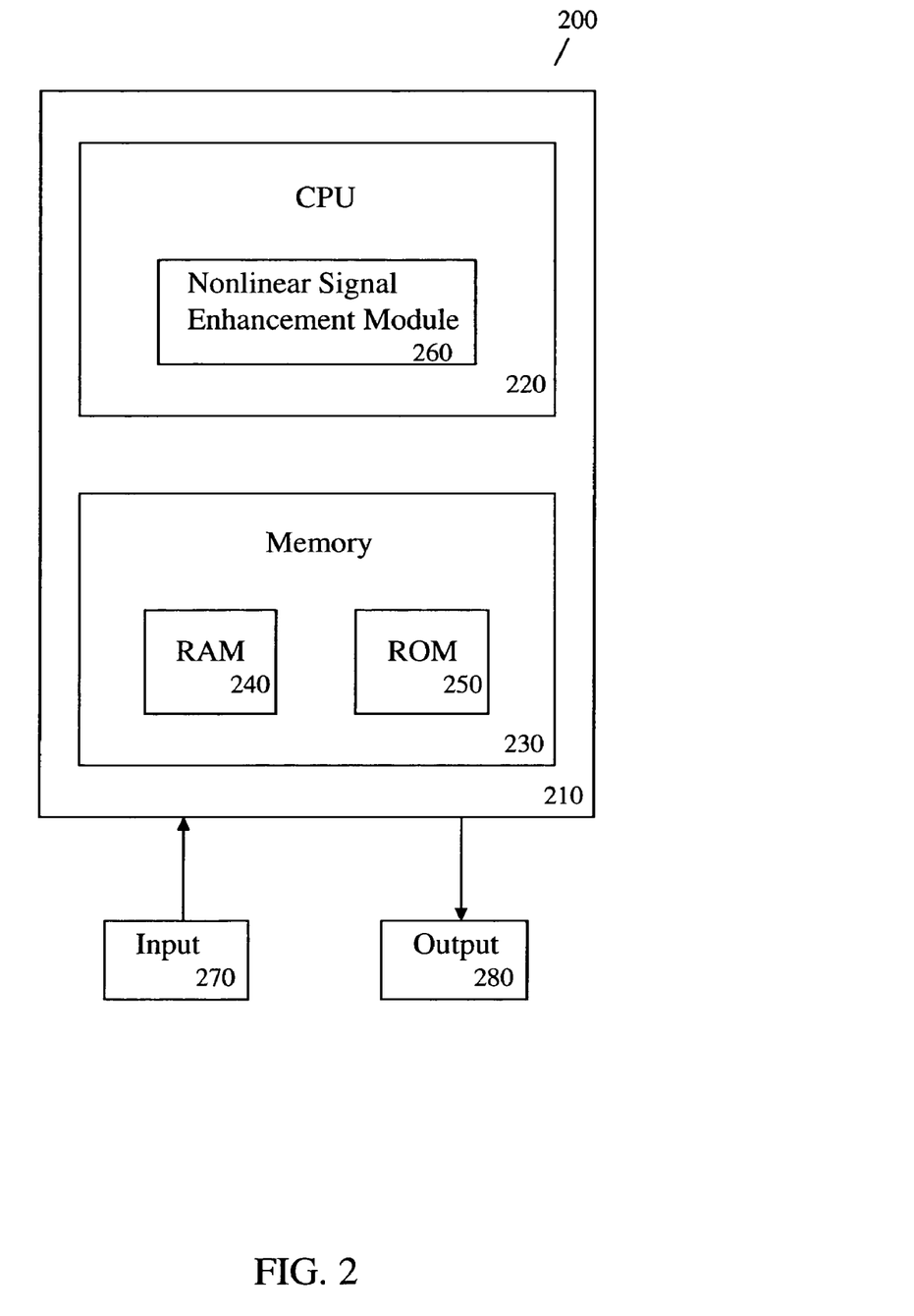
FIG. 2 is a block diagram of a computer system for use with an exemplary embodiment of the present invention.

FIG. 2 is a block diagram of a computer system 200 for use with an exemplary embodiment of the present invention. As shown in FIG. 2, the system 200 includes, inter alia, a personal computer (PC) 210 connected to an input device 270 and an output device 280. The PC 210, which may be a portable or laptop computer or a personal digital assistant (PDA), includes a central processing unit (CPU) 220 and a memory 230. The CPU 220 includes a nonlinear signal enhancement module 260 that includes one or more methods for performing nonlinear signal enhancement that does not use a noisy phase or estimate of a signal.

The memory 230 includes a random access memory (RAM) 240 and a read only memory (ROM) 250. The memory 230 can also include a database, disk drive, tape drive or a combination thereof. The RAM 240 functions as a data memory that stores data used during execution of a program in the CPU 220 and is used as a work area. The ROM 250 functions as a program memory for storing a program executed in the CPU 220. The input device 270 is constituted by a keyboard, mouse, microphone or an array of microphones and the output device 280 is constituted by a liquid crystal display (LCD), cathode ray tube (CRT) display, printer or loudspeaker.

Before describing the method of nonlinear signal enhancement according to an exemplary embodiment of the present invention, its derivation will be discussed.

1. Initial Considerations

In formulating the method of nonlinear signal enhancement, an additive model given by equation (1) is first considered.

$$x(t)=s(t)+n(t), 0 \leq t \leq T \qquad (1)$$

As shown in equation (1), x(t) is a measured signal, s(t) is an unknown source signal and n(t) is a noise signal, all signals are considered at a time t. The signal $(x(t))_{0 \leq t \leq T}$ is "vectorized" into sequence vectors $(x(k))_{0 \leq k \leq K}$, where each x(k) is an M-vector $x(k)_n$=x(kB+n), where $0 \leq n \leq M-1$, and B is a time step, which is roughly BK=T. A window g of a size M is applied to the measured signal followed by the Fourier transform of equation (2):

$$X(k, \omega) = \frac{1}{\sqrt{F}} \sum_{n=0}^{M-1} e^{-2\pi j\omega n/F} x(k)_n g(n), 0 \leq \omega \leq F-1 \qquad (2)$$

where the window g defines a linear operator $T:R^M \to C^F$. When F>M equation (2) may be referred to as being redundant by oversampling in the frequency domain. An overlap fraction $$\frac{M}{b}$$

represents oversampling in the frequency domain. The redundancy by oversampling in the frequency domain of equation (2) is then considered.

For example, the inversion of the transformation of equation (2), which is a linear transform, is implemented using an "overlap-add" procedure shown below in equation (3):

$$z(t) = \frac{1}{\sqrt{F}} \sum_k \sum_{\omega=0}^{F-1} e^{2\pi j\omega t/F} Z(k, \omega) \tilde{g}(t - kB) \quad (3)$$

where k ranges over the set of integers so that $0 \leq t-kB \leq M-1$, and a "dual" window g, which depends on parameters M, B, are computed to give a perfect reconstruction z=x, when Z=X. The inversion of equation (3) defines a linear operator $U: C^F \to R^M$ and the perfect reconstruction condition reads UT=I, where I is the identity matrix of a size M.

Conventional noise reduction algorithms use equation (2) as an analysis operator to represent the measured signal in the time-frequency domain. In the time-frequency domain, the estimation procedure implements a nonlinear estimator E(.) of the type shown below in equation (4):

$$Y(k,\omega) = E(|X(k,\omega)|) \quad (4)$$

followed by the inversion of equation (3) with, $$Z(k, \omega) = Y(k, \omega) \frac{X(k, \omega)}{|X(k, \omega)|} \quad (5)$$

Nonlinear functions of E(.), which are used to implement existing estimation algorithms, require additional information such as the statistics of the noise component or of the signal component, which are obtained separately. These algorithms use equations (3 and 5) to revert to the time-domain. Given the initial considerations, the method of the present invention will now be discussed where the transformation of equation (2) is inverted using only the absolute values of $X(k,\omega)$.

2. The Reconstruction Scheme

Starting with, for example, only two samples, $x_1$, $x_2$, the following four linear transformations shown below in equations (6-9) followed by a modulus are considered:

$$Y_1 = |x_1 + x_2| \quad (6)$$

$$Y_2 = |x_1 + jx_2| \quad (7)$$

$$Y_3 = |x_1 - 2x_2| \quad (8)$$

$$Y_4 = |x_1 - 2jx_2| \quad (9)$$

Direct computations of equations (6-9) produce the following equations (10 and 11):

$$x_1 = \pm \sqrt{3Y_2^2 - Y_1^2 - \frac{1}{2}Y_3^2} \quad (10)$$

$$x_2 = \frac{Y_1^2 - Y_2^2}{2x_1} \quad (11)$$

for $x_1 \neq 0$, $$x_1 = 0 \quad (12)$$

$$x_2 = \pm \sqrt{\frac{1}{2} Y_3^2 - Y_1^2} \quad (13)$$

otherwise, equations (12 and 13) are produced. As can be seen, there remains an ambiguity regarding the signs (e.g., +/− signs). Therefore, a stochastic principle can be used to determine whether the sign is + or −. To determine a solution, the set $(Y_1, Y_2, Y_3, Y_4)$ of nonnegative numbers from equations (6-9) has to satisfy a series of constraints shown in equations (14 and 15):

$$2(Y_1^2 - Y_2^2) = Y_4^2 - Y_3^2 \quad (14)$$

$$3Y_2^2 \geq Y_1^2 + \frac{1}{2} Y_3^2 \quad (15)$$

If, for example, there is a 4-tuple of the set of nonnegative numbers $(Y_1, Y_2, Y_3, Y_4)$ that do not satisfy equations (14 and 15), then the reconstruction scheme may be used to interpolate between admissible values.

The algorithms to be discussed below evolve from the above reconstruction scheme. In these algorithms, one first considers the general case of an F-vector $(Y_1, Y_2 \ldots Y_F)$. Then, linear transformations coming from Parceval frames will be considered, thus leading to a scaling as shown in equation (16).

$$\sum_{n=0}^{M-1} |x(k)_n|^2 = \sum_{f=0}^{F} Y_f^2 \quad (16)$$

Consequently, an inversion will be defined as shown in equation (17), $$Z_k = \frac{Y_k}{\sqrt{Y_1^2 + \ldots + Y_F^2}}, 1 \leq k \leq F \quad (17)$$

in addition, the inversion map will implement a map shown in equation (18):

$$Q: S^{F-1} \cap (R^+)^F \to S^{M-1} \quad (18)$$

between an F−1 dimensional unit sphere with nonnegative entries $S^{F-1} \cap (R^+)^F$ and the M−1 dimensional unit sphere $S^{M-1}$.

2.1. The Neural Network Algorithm

In the neural network algorithm, one first considers a 3-layer neural network defined by equations (19 and 20):

$$q_k = \sigma\left(\sum_{f=1}^{F} a_{kf} Z_f + \theta_k\right), 1 \leq k \leq L \quad (19)$$

$$z_m = \sigma\left(\sum_{k=1}^{L} b_{mk} q_k + \tau_m\right), 1 \leq m \leq M \quad (20)$$

where $A=(a_{kf})_{1 \leq k \leq L,\ 1 \leq f \leq F}$, $B=(b_{mk})_{1 \leq m \leq M,\ 1 \leq m \leq M}$, and $\theta=(\theta_k)_{1 \leq k \leq L}$, $\tau=(\tau_m)_{1 \leq m \leq M}$ are network parameters. They may be compactly written as $\pi=(A, B, \theta, \tau)$. As shown in equation (20) an input vector $Z=(Z_1, Z_2 \ldots Z_F)$ is processed to produce an output vector $z=(z_1, z_2 \ldots z_M)$. To achieve the mapping shown in equation (18), the network output $z=(z_m)_{1 \le m \le M}$ has to be normalized to the norm of the input vector Y, and then assigned a sign as shown below in equation (21):

$$u_m = \rho z_m \sqrt{\frac{Y_1^2 + \ldots + Y_F^2}{z_1^2 + \ldots + z_M^2}} \quad (21)$$

The sign $\rho$ is decided based on a maximum likelihood estimation principle and assuming the noise is Gaussian with a variance $b^2$, the two likelihoods are defined in equations (22 and 23):

$$p(x = u + n \mid \rho = +1) \propto \sum_{k=1}^{M} \|x_k - |u_k|\|^2 \quad (22)$$

$$p(x = u + n \mid \rho = -1) \propto \sum_{k=1}^{M} \|x_k + |u_k|\|^2 \quad (23)$$

Therefore, the sign is determined by equation (24):

$$\rho = \begin{cases} +1 & \text{if } \sum_{k=1}^{M} \|x_k - |u_k|\|^2 \le \sum_{k=1}^{M} \|x_k + |u_k|\|^2 \\ -1 & \text{if otherwise} \end{cases} \quad (24)$$

The training of the network, for example, the learning of the parameters of $\pi=(A, B, \theta, \tau)$, may be done as shown in equation (25):

$$\pi^{t+1} = \pi^t - \alpha \frac{\partial}{\partial \pi} \sum_{m=1}^{M} |u_m - s_m|^2 \quad (25)$$

with the learning rate $\alpha=10^{-8}$, and $Y=|T(s+v)|$ with T being the linear analysis operator shown, for example, in equation (2) and $(v=(v_m)_{1 \le m \le M}, s=(s_m)_{1 \le m \le M})$ from a training set made of speech and noise signals. For training one can generate random vectors of M components or use a database of speech and noise signals and divide each signal into vectors of a size M.

2.2. The Distance Optimization Algorithm

In the distance optimization algorithm, a distance minimization criterion may be used. More specifically, let $\Sigma$ denote the set of all possible F-nonnegative vectors Y obtained by taking the absolute value of the linear transformation T in equation (2). Given an F-vector $Y \in (R^+)^F$, which is not necessarily in $\Sigma$, the closest element in $\Sigma$ to Y is found, and then it is nonlinearly inverted as shown below in equation (26).

$$\hat{Y} = \text{argmin}_{Y' \in \Sigma} \sum_{k=1}^{F} |Y_k - Y'_k|^2 \quad (26)$$

Equation (26) is equivalent to the optimization shown in equation (27):

$$\min_{0 \le \alpha_k < 2\pi, 2 \le k \le F} \sum_{k=1}^{F} |Y'_k - TU(Y'))k|^2, Y' = (e^{j\alpha_k} Y_k)_{1 \le k \le F}, \alpha_1 = 0 \quad (27)$$

where $\alpha_1=0$ fixes the sign ambiguity. This optimization then defines the inverse in equation (28):

$$z=\rho U(Y^0), Y_k^0 = e^{j\alpha_k^O} Y_k \quad (28)$$

with $\alpha^0 = (\alpha_k^0)_{1 \le k \le F}$, being the solution of equation (27) and $\rho = \pm 1$ being defined by equation (24). The optimization of equation (27) can then be performed using a gradient algorithm.

2.3. The Iterative Signal Reconstruction Algorithm

Figure 3:
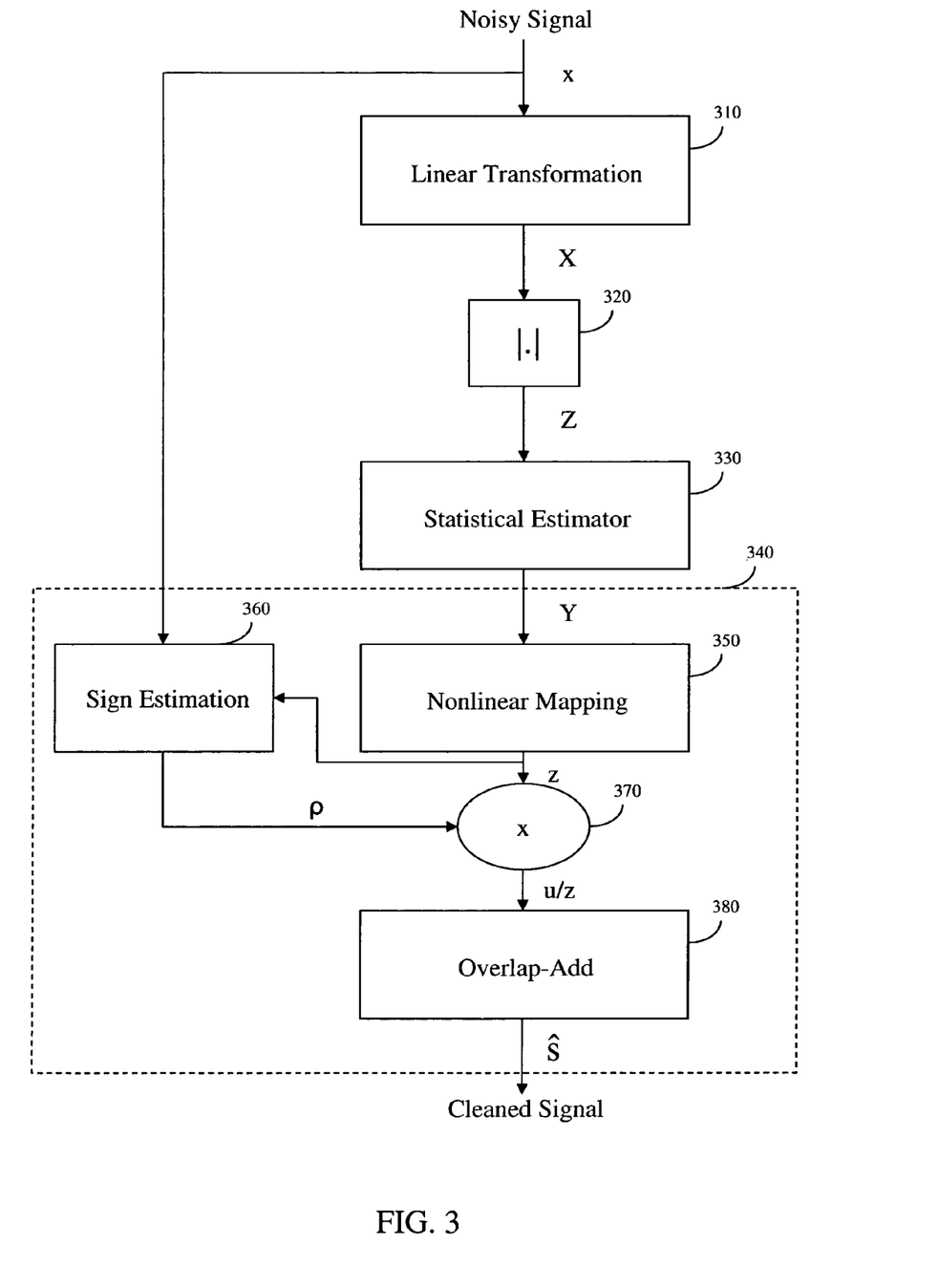
FIG. 3 is a flowchart illustrating a method for nonlinear signal enhancement that bypasses a noisy phase of a signal according to an exemplary embodiment of the present invention.

The iterative signal reconstruction algorithm works as follows. Let $Y \in (R^+)^F$ be the vector of, for example, absolute value estimates shown by (Z) in FIG. 3. Next, let T denote the linear transformation as shown by (X) in FIG. 3, and let U denote a left universe. In other words, let U denote another linear transformation that can be used with T to perform a perfect reconstruction, UT=Identity (e.g., T can be a Fourier transform, and U can be an inverse Fourier transform). Then choose $\epsilon > 0$ a stopping threshold, e.g., $\epsilon = 10^{-3}$. The iterative signal reconstruction algorithm then iterates the following steps:

(1) Set k=0, $Y_0$=Y.
(2) Compute $z_k$=U$Y_k$.
(3) Compute W=T$z_k$.
(4) Compute equation (29) below.

$$Y_{k+1}(n) = Y(n) \frac{W(n)}{|W(n)|}, n = 1, 2, \ldots, F \quad (29)$$

(5) If $\|Y_k - Y_{k+1}\| > \epsilon$ then increment k=k+1 and go to step 2; otherwise stop.

The estimated or reconstructed signal is indicated by the last computed $z_k$.

2.4. Nonlinear Signal Reconstruction

Nonlinear signal reconstruction that does not use a noise component of a signal will now be discussed with reference to FIG. 3. As shown in FIG. 3, a linear transformation such as a Fourier transform or a wavelet transform is applied to a signal (x) (shown in equation (1)) comprising a noise component and an unknown source component giving a representation of the signal (X) in the transformed domain (310). The signal (x) may be acquired using a microphone or a database comprising audio signals and image signals. After the signal (x) is transformed, the modulus or absolute value (Z) of the transformed signal (X) is determined (320). Upon determining the modulus (Z) of the transformed signal, a statistical estimation (Y) of a noise free part of the transformed signal is determined (330).

The statistical estimation may be performed by using equation (4), Wiener filtering or by using an Ephraim-Malah estimation technique. The statistical estimation may also be performed using a spectral subtracting technique by solving equations (30), (31) and (32):

$$Y(k, \omega) = \begin{cases} |X(k, \omega)| - \sqrt{R_n(k, \omega)} & \text{if } |X(k, \omega)|^2 \geq R_n(k, \omega) \\ 0 & \text{if otherwise} \end{cases} \quad (30)$$

$$R_n(k, \omega) = \min_{k-W \leq k' \leq k} R_x(k', \omega) \quad (31)$$

$$R_x(k, \omega) = (1 - \beta)R_x(k-1, \omega) + \beta|X(k, \omega)|^2 \quad (32)$$

After performing the statistical estimation (Y) of the noise free part of the transformed signal, the unknown source component of the signal (x) is reconstructed using the statistical estimation (Y) of noise-free part of the linear transformed signal (340). The unknown source component of the signal (x) may be reconstructed by using the neural network, distance optimization and iterative signal reconstruction algorithms. In reconstructing the unknown source component using an alternative variant of the neural network and distance optimization algorithms, a nonlinear transformation or mapping of the statistical estimation (Y) is performed (350). The nonlinear mapping in the neural network algorithm may be performed by using equation (33), $$u_m = z_m \sqrt{\frac{Y_1^2 + \ldots + Y_F^2}{z_1^2 + \ldots + z_M^2}} \quad (33)$$

after defining a three layer neural network using equations (19 and 20). Nonlinear mapping in the distance optimization algorithm may be performed by using equation (34), $$z = U(Y^O), Y_k^O = e^{ja_k^O} Y_k \quad (34)$$

After nonlinear mapping is performed, the sign ($\rho$) of the source component of the signal (x) is determined (360). The sign ($\rho$) is determined by using equation (24). After determining the sign ($\rho$), the product (u/z) of the sign ($\rho$) and the nonlinear mapped signal (z) is determined (370). Upon determining the product (u/z), a conventional overlap-add procedure such as that shown in equation (3), is performed on the product (u/z) (380) and a cleaned signal or reconstructed unknown source signal $\hat{S}$ results, which may then be output to a loudspeaker or further analyzed by an automatic speech recognition system.

2.5. Proofs

A set of proofs, which show nonlinear mapping is mathematically well defined, will now be described. This set of proofs is described in the paper entitled, "On Signal Reconstruction Without Noisy Phase", Radu Balan, Pete Casazza, Dan Edidin, Dec. 20, 2004, available at (http://front.math.ucdavis.edu/author/Balan-R*), a copy of which is herein incorporated by reference.

By constructing new classes of Parseval frames for a Hilbert space, it will be shown that new classes of Parseval frames allow for the reconstruction of a signal without using its noisy phase or its estimation. Frames are redundant systems of vectors in Hilbert spaces. They satisfy the property of perfect reconstruction, in that any vector of the Hilbert space can be synthesized back from its inner products with the frame vectors. More precisely, the linear transformation from the initial Hilbert space to the space of coefficients obtained by taking the inner product of a vector with the frame vectors is injective and hence admits a left inverse. The follow proofs will show what kind of reconstruction is possible if one only has knowledge of the absolute values of the frame coefficients.

First, consider a Hilbert space H with a scalar product <,>. A finite or countable set of vectors F={$f_i$, i∈I} of H is called a frame if there are two positive constants A, B>0 such that for every vector x∈H, $$A\|x\|^2 \leq \sum_{i \in I} |\langle x, f_i \rangle|^2 \leq B\|x\|^2 \quad (2.1)$$

The frame is tight when the constants can be chosen equal to one another, A=B. For A=B=1, F is called a Parceval frame. The numbers $\langle x, f_i \rangle$ are called frame coefficients.

To a frame F associate the analysis and synthesis operators defined by:

$$T: H \to l^2(\mathbb{I}), T(x) = \{\langle x, f_i \rangle\}_{i \in \mathbb{I}} \quad (2.2)$$

$$T^*: l^2(\mathbb{I}) \to H, T^*(c) = \sum_{i \in I} c_i f_i \quad (2.3)$$

which are well defined due to equation (2.1), and are adjacent to one another. The range of T in $l^2(I)$ is called the range of coefficients. The frame operator defined by S=T*T:H→H is invertible by equation (2.1) and provides the perfect reconstruction formula:

$$x = \sum_{i \in \mathbb{I}} \langle x, f_i \rangle S^{-1} f_i \quad (2.4)$$

Consider now, the nonlinear mapping:

$$M_a: H \to l^2(I), M_a(x) = \{|\langle x, f_i \rangle|\}_{i \in I} \quad (2.5)$$

obtained by taking the absolute value entry of the analysis operator. Denote by $H_r$ the quotient space $H_r = H/\sim$ obtained by identifying two vectors that differ by a constant phase factor: x~y if there is a scalar c with |c|=1 so that y=cx. For real Hilbert spaces c can only be +1 or −1, and thus $H_r$=H/{±1}. For complex Hilbert spaces c can be any complex number of modulus one, $e^{i\Phi}$, and then $H_r = H/T^1$, where $T^1$ is the complex unit circle. Thus, two vectors of H in the same ray would have the same image through $M_a$. Thus the nonlinear mapping $M_a$ extends to $H_r$ as:

$$M: H_r \to l^2(I), M(\hat{x}) = \{|\langle x, f_i \rangle|\}_{i \in I}, x \in \hat{x} \quad (2.6)$$

The following description will also center around the injectivity of the map M. For example, when it is injective, M admits a left inverse, meaning that any vector (e.g., signal) in H can be reconstructed up to a constant phase factor from the modulus of its frame coefficients.

Referring back to the conventional signal enhancement method shown in FIG. 1, the Ephraim-Malah noise reduction method may be used. Let {x(t), t=1, 2 . . . T} be the samples of a speech signal. These samples are first transformed into the time-frequency domain through:

$$X(k, \omega) = \sum_{t=0}^{M-1} g(t)x(t + kN)e^{-2\pi i \omega \frac{t}{M}}, \quad (2.7)$$

$$k = 0, 1, \ldots, \frac{T-M}{N}, \omega \in \{0, 1, \ldots, M-1\}$$

where g is the analysis window, and M, N are respectively the window size, and the time step. Next, a nonlinear transformation is applied to $|X(k, \omega)|$ to produce a minimum mean square error (MMSE) estimate of the short-time spectral amplitude:

$$Y(k, \omega) = \frac{\sqrt{\pi}}{2} \frac{\sqrt{\upsilon(k, \omega)}}{\gamma(k, \omega)} \exp\left(-\frac{\upsilon(k, \omega)}{2}\right) \qquad (2.8)$$

$$\left|(1 + \upsilon(k, \omega))I_0\left(\frac{\upsilon(k, \omega)}{2}\right) + \upsilon(k, \omega)I_1\left(\frac{\upsilon(k, \omega)}{2}\right)\right| \|X(k, \omega)|$$

where $I_0$, $I_1$ are modified Bessel functions of zero and first order, and $\upsilon(k, \omega), \gamma(k, \omega)$ are estimates of certain signal-to-noise ratios. The speech signal windowed Fourier coefficients are estimated by:

$$\hat{X}(k, \omega) = Y(k, \omega) \frac{X(k, \omega)}{|X(k, \omega)|} \qquad (2.9)$$

and then transformed back into the time domain though an overlap-add procedure:

$$\hat{x}(t) = \sum_{k} \sum_{\omega=0}^{M-1} \hat{X}(k, \omega) e^{2\pi i \omega \frac{t-kN}{M}} h(t - kN) \qquad (2.10)$$

where h is the synthesis window. This example illustrates that nonlinear estimation in the representation domain modifies only the amplitude of the transformed signal and keeps its noisy phase.

Similarly, in automatic speech recognition systems, given a voice signal $\{x(t), t=1, 2 \ldots T\}$, the automatic speech recognition system outputs a sequence of recognized phonemes from an alphabet. The voice signal is transformed into the time-frequency domain by the same discrete windowed Fourier transform shown in equation (2.7). The real cepstral coefficients $C_x(k, \omega)$ are defined as the logarithm of the modulus of $X(k, \omega)$:

$$C_x(k, \omega) = \log(|X(k, \omega)|) \qquad (2.11)$$

Two rationales have been discussed for using this object. First, the recorded signal $x(t)$ is a convolution of the voice signal $s(t)$ with the source-to-microphone (e.g., channel) impulse response h. In the time frequency domain, the convolution almost becomes a multiplication and the cepstral coefficients decouple as shown in equation (2.12):

$$C_x(k, \omega) = \log(|H(\omega)|) + C_s(k, \omega) \qquad (2.12)$$

where $H(\omega)$ is the channel transfer function, and $C_s$ is the voice signal cepstral coefficient. Because the channel function is invariant, by subtracting the time average we obtain:

$$F_x(k, \omega) = C_x(k, \omega) - \epsilon[C_x(\cdot, \omega)] = C_s(k, \omega) - \epsilon[C_s(\cdot, \omega)] \qquad (2.13)$$

where $\epsilon$ is the time average operator. Thus, $F_x$ encodes information regarding the speech signal alone, independent of the reverberant environment. The second rationale for using $C_x$ and thus $F_x$, is that phase does not matter in speech recognition. Thus, by taking the modulus in equation (2.11) one does not lose information about the message.

Returning to the automatic speech recognition system, the spectral coefficients $F_x$ are fed into several hidden Markov models, one hidden Markov model for each phoneme. The outputs of the hidden Markov models give an utterance likelihood of a particular phoneme and the automatic speech recognition system chooses the phoneme with the largest likelihood. This example also illustrates that the transformed domain signal has either a secondary role or none whatsoever.

2.5(a). Analysis of M for Real Frames

Consider the case $H=R^N$, where the index set I has cardinality M, $I=\{1, 2 \ldots M\}$. Then $l^2(I) \simeq R^M$. For a frame $F=\{f_1, f_2 \ldots f_M\}$ of $R^N$, denote T by the analysis operator, $$T: \mathbb{R}^N \to \mathbb{R}^M, \quad T(x) = \sum_{k=1}^{M} \langle x, f_k \rangle e_k, \quad x \in \hat{x} \qquad (2.14)$$

where $\{e_1, e_2 \ldots e_M\}$ is the canonical basis of $R^M$. Let W denote the range of the analysis map $TR^N$ that is an N-dimensional subspace of $R^M$. Recall the nonlinear map we are using:

$$\mathbb{M}^F: \mathbb{R}^N / \{\pm 1\} \to \mathbb{R}^M, \quad \mathbb{M}^F(\hat{x}) = \sum_{k=1}^{M} |\langle x, f_k \rangle| e_k; \qquad (2.15)$$

When there is no confusion, F will be dropped from the notation.

Two frames $\{f_i\}_{i \in I}$ and $\{g_i\}_{i \in I}$ are equivalent if there is an invertible operator T on H with $T(f_i) = g_i$, for all $i \in I$. It is known that two frames are equivalent if their associated analysis operators have the same range. Next, deduce that M-element frames on $R^N$ are parameterized by the fiber bundle F(N, M; R), which is the GL(N, R) bundle over the Grassmanian Gr(N,M).

The analysis will now be reduced to equivalent classes of frames:

Proposition 2.1. For any two frames F and G that have the same range of coefficients, $M^F$ is injective if $M^G$ is injective.

Proof. Any two frames $F=\{f_k\}$ and $G=\{g_k\}$ that have the same range of coefficients are equivalent, e.g., there is an invertible $R:R^N \to R^N$ so that $g_k=Rf_k$, $1 \leq k \leq M$. Their associated nonlinear maps $M^F$, and respectively $M^G$, satisfy $M^G(x)=M^F(R^*x)$. This shows that $M^F$ is injective if $M^G$ is injective. Consequently, the property of injectivity of M depends only on the subspace of coefficients W in Gr(N,M).

This result shows that for two frames corresponding to two points in the same fiber F(N, M; R), the injectivity of the their associated nonlinear maps would jointly hold true or fail. Because of this, one shall assume that induced topology is based on manifold Gr(N,M) of the fiber bundle F(N, M; R) into the set of M-element frames of $R^N$.

If $\{f_i\}_{i \in I}$ is a frame with a frame operator S then $\{S^{-1/2}f_i\}_{i \in I}$ is a Parseval frame which is equivalent to $\{f_i\}_{i \in I}$ and called the canonical Parseval frame associated to $\{f_i\}_{i \in I}$. Also, $\{S^{-1}f_i\}_{i \in I}$ is a frame equivalent to $\{f_i\}_{i \in I}$ and is called the canonical dual frame associated to $\{f_i\}_{i \in I}$. Proposition 2.1 shows that when the nonlinear map $M^F$ is injective then the same property holds for the canonical dual frame and the canonical Parseval frame.

Given $S \subset \{1, 2 \ldots M\}$ define a map of $\sigma_s: R^M \to R^M$ by the equation:

$$\sigma_S(a_1, \ldots, a_M) = ((-1)^{S(1)}a_1, \ldots, (-1)^{S(M)}a_M) \qquad (2.16)$$

Clearly $\sigma_S^2$=id and $\sigma_S c$=$-\sigma_S$ where $S^C$ is the complement of S. Let $L^S$ denote the $|S|$-dimensional linear subspace of $R^M$ where $L^S=\{(a_1, a_2 \ldots a_M)|a_i=0, i \in S\}$, and let $P^S:R^M \to L^S$ denote the orthogonal projection onto this subspace. Thus, $(P_S(u))_i=0$, if $i \in S$, and $(P_S(u))_i=u_i$ if $i \in S^C$. For every vector $u \in R^M$, $\sigma_s(u)=u$ iff $u \in L^S$. Likewise $\sigma_s(u)=-u$ iff $u \in (L^S)^C$. Note:

$$P_S(u) = \frac{1}{2}(u + \sigma_S(u)), \quad P_{S^C}(u) = \frac{1}{2}(u - \sigma_S(u)) \qquad (2.17)$$

Theorem 2.2. (Real Frames). If $M \geq 2N-1$ then for a generic frame F, M is injective. Generic means an open dense subset of the set of all M-element frames in $R^N$.

Proof. Suppose that x and x' have the same image under $M=M_F$. Let $a_1, a_2 \ldots a_M$ be the frame coefficients of x, and $a_1' \ldots a_M'$ the frame coefficients for x'. Then $a_i' = \pm a_i$ for each i. In particular, there is a subset $S \subset \{1, 2 \ldots M\}$ of indices such that $a_i' = (-1)^{S(i)} a_i$ where the function S(i) is the characteristic function of S and is defined by the rule that S(i)=1 if $i \in S$ and S(i)=0 if $i \notin S$. Then two vectors x, x' have the same image under M if there is a subset $S \subset \{1, 2 \ldots M\}$ such that $(a_1, a_2 \ldots a_M)$ and $((-1)^{s(1)} a_1, a_2 \ldots (-1)^{S(M)} a_M)$ are both in W the range of coefficients associated with F.

To finish the proof it will be shown that when $M \geq 2N-1$ such a condition is not possible for a generic subspace $W \subset R^N$. This means that a set of such W's is a dense (e.g., Zariski) open set in the Grassmanian Gr(N,M). In particular, the probability that a randomly chosen W will satisfy this condition is 0.

To finish the proof the following Lemma is needed.

Lemma 2.3. If $M \geq 2N-1$ then the following holds for a generic N-dimensional subspace $W \subset R^M$. Given $u \in W$ then $\sigma_s(u) \in W$ iff $\sigma_s(u) = \pm u$.

Proof. Suppose $u \in W$ and $\sigma_s(u) \neq \pm u$ but $\sigma_s(u) \in W$. Because $\sigma_s$ is an involution, $u + \sigma_s(u)$ is fixed by $\sigma_s$ and is non-zero, thus $W \cap L^S \neq 0$. Likewise, $$0 \neq u - \sigma_S(u) = u + \sigma_{S^C}(u) \qquad (2.18)$$

Therefore, $W \cap (L^S)^C \neq 0$.

Now $L^S$ and $(L^S)^C$ are fixed linear subspaces of dimension $M-|S|$ and $|S|$. If $M \geq 2N-1$ then one of these subspaces has a co-dimension greater than or equal to N. However a generic linear subspace W of dimension N has 0 intersections with a fixed linear subspace of co-dimension greater than or equal to N. Therefore, if W is generic and x, $\sigma_s(x) \in W$ then $\sigma_s(x) = \pm x$ which ends the proof of the Lemma.

The proof of the theorem now follows from the fact that if W is in the intersection of generic conditions imposed by the proposition for each subset $S \subset \{1, 2 \ldots M\}$ then W satisfies the conclusion of the theorem.

The proof of Lemma 2.3 actually shows:

Corollary 2.4. The map M is injective if when there is a non-zero element $u \in W \subset R^M$ with $u \in L^S$, then $W \cap (L^S)^C = \{0\}$.

Now it will be observed that the result is very good.

Proposition 2.5. If $M \geq 2N-2$, then the result fails for all M-element frames.

Proof of Proposition 2.5. Because $M \geq 2N-2$, we have that $2M-2N+2 \leq M$. Let $(e_i)_{i=1}^M$ be the canonical orthonormal basis of $R^M$. $(e_i)_{i=1}^M = (e_i)_{i=1}^k \cup (e_i)_{i=k+1}^M$ can then be written where both k and M-k are $\geq M-N+1$.

Let W be any N-dimensional subspace of $R^M$. Because dim $W^\perp = M-N$, there exists a nonzero vector $u \in (e_i)_{i=1}^k$ so that $u \perp W^\perp$, hence $u \in W$. Similarly, there is a nonzero vector v in span $(e_i)_{i=k+1}^M$ with $u \perp W^\perp$, that is $v \in W$. By the above corollary, M cannot be infective. In fact $M(u+v) = M(u-v)$.

The next result provides an easy way for frames to satisfy the above condition.

Corollary 2.6. If F is an M-element frame for $R^N$ with $M \geq 2N-1$ having the property that every N-element subset of the frame is linearly independent, then M is infective.

Proof. Given the conditions, it follows that W has no elements, which are zero in N coordinates, so the Corollary holds.

Corollary 2.7. (1) If $M=2N-1$, then the condition given in Corollary 2.6 is also necessary. (2) If $M \geq 2N$, this condition is no longer necessary.

Proof. (1) For (1) in Corollary 2.7, the contrapositive will be proven. Let $M=2N-1$ and assume there is an N-element subset $(f_i)_{i \in S}$ of F which is not linearly independent. Then there is a nonzero $x \in (\text{span } (f_i)_{i \in S})^{195} \subset R^N$ Hence, $0 \neq u = T(x) \in L^S \cap W$. On the other hand, because $\dim(\text{span}(f_i)_{(i \in S)}^C) \leq N-1$, there is a nonzero $y \in (\text{span}(f_i)_{(i \in S)}^C)^\perp \subset R^N$ so that $0 \neq v = T(y) \in (L^S)^C \cap W$. Now, by Corollary 2.4, M is injective.

(2) If $M \geq 2N$ an M-element frame for $R^N$ that has a linearly dependent subset is constructed. Let $F' = \{f_1, \ldots f_{2N-1}\}$ be a frame for $R^N$ so that any N-element subset is linearly independent. By Corollary 2.4, the map $M^{F'}$ is infective. Now extend this frame to $F = \{f_1 \ldots f_M\}$ by $f_{2N} = \ldots = f_M = f_{2N-1}$. The map $M^F$ extends $M^{F'}$ and therefore remains infective, whereas any N-element subset that contains two vectors from $\{f_{2N-1}, f_{2N} \ldots f_M\}$ is no longer linearly independent.

It is noted that the above-mentioned frames can be constructed "by hand". For example, start with an orthonormal basis for $R^N$, say $(f_i)_{i=1}^N$. Assume that sets of vectors $(f_i)_{i=1}^M$ have been constructed such that every subset of N vectors is linearly independent. Observe the span of all the (N-1)-element subsets of $(f_i)_{i=1}^M$. Pick $f_{M+1}$ not in the span of any of these subsets. Then $(f_i)_{i=1}^{M+1}$ has the property that every N-element subset is linearly independent.

Now a slightly different proof of this result will be provided that gives necessary and sufficient conditions for a frame to have the required properties.

Theorem 2.8. Let $(f_i)_{i=1}^M$ be a frame for $R^N$. The following are equivalent:

(1) The map M is injective; and (2) For every subset $S \subset \{1, 2 \ldots M\}$, either $(f_i)_{i \in S}$ spans $R^N$ or $(f_i)_{(i \in S)^C}$ spans $R^N$.

Proof. (1) $\to$ (2): The contrapositive is proven. Therefore, assume that there is a subset $S \subset \{1, 2 \ldots M\}$ so that neither $\{f_i; i \in S\}$ nor $\{f_i; i \in S^C\}$ spans $R^N$. Hence there are nonzero vectors x, $y \in R^N$ so that $x \perp \text{span } (f_i)_{i \in S}$ and $y \perp \text{span } (f_i)_{i \in S}^C$. Then $0 \neq T(x) \in L^S \cap W$ and $0 \neq T(x) \in (L^S)^C \cap W$. Now by Corollary 2.4 M cannot be injective.

(2) $\to$ (1): Assume $M(\hat{x})$ for some $M(\hat{y})$. This means for every $1 \leq j \leq M$, $|<x, f_j>| = |<y, f_j>|$ where $x \in \hat{x}$ and $y \in \hat{y}$. Let, $$S = \{j: <x, f_j> = -<y, f_j>\} \qquad (2.19)$$

and note, $$S^C = \{j: <x, f_j> = <y, f_j>\} \qquad (2.20)$$

Now, $x+y \perp \text{span}(f_i)_{i \in S}$ and $x-y \perp \text{span}(f_i)_{i \in S^C}$. Assume that $\{f_i; i \in S\}$ spans $R^N$. Then $x+y=0$ and thus $\hat{x}=\hat{y}$. If spans $\{f_i; i \in S^C\}$ then $x-y=0$ and again $\hat{x}=\hat{y}$. Either way $\hat{x}=\hat{y}$ which proves M is injective.

For M<2N−1 there are numerous frames for which M is not injective. However for a generic frame, it can be shown that the set of rays that can be reconstructed from the image under M is open dense in $R^N/\{\pm 1\}$.

Theorem 2.9. Assume M>N. Then for a generic frame $F \in F[N, M; R]$, the set of vectors $x \in R^N$ so that $(M^F)^{-1}(M_a^F(x))$ consists of one point in $R^N/\{\pm 1\}$ has a dense interior in $R^N$.

Proof. Let F be an M-element frame in $R^N$. Then F is similar to a frame G that consists of the union of the canonical basis of $R^N$ $\{d_1 \ldots d_N\}$, with some other set of M−N vectors. Let $G=\{(gk; 1 \leq k \leq M\}$. Thus, $gk_j=d_j$, $1 \leq k \leq M$, for some N elements $\{k_1, k_2 \ldots k_N\}$ of $\{1, 2 \ldots M\}$. Consider now the set of B frames F so that its similar frame G constructed above has a vector $g_k$ with all entries zero, $$B = \left\{ \mathcal{F} \in \mathcal{F}[N, M; \mathbb{R}] \,|\, \mathcal{F} \sim \mathcal{G} = \{g_k\}, \right. \quad (2.21)$$

$$\left. \{d_1, \ldots, d_N\} \subset \mathcal{G}, \prod_{j=1}^{N} \langle g_{k_0}, d_j \rangle \neq 0, \text{ for some } k_0 \right\}$$

Clearly B is open dense in F[N, M; R]. Thus, generically $F \in B$. Let $G=\{gk; 1 \leq k \leq M\}$ be its similar frame satisfying the condition above. Next, prove the set $X=X^F$ of vectors $x \in R^N$ so that $(M^G)^{-1}(M_a^G(x))$ has more than one point that is thin, e.g., it is included in a set whose complement is open an dense in $R^N$. Then claim $X \subset \cup_S(V_S^+ \cup V_S^-)$ where $(V_S^\pm)_{S \subset \{1,2\ldots N\}}$ are linear subspaces of $R^N$ of codimension 1 indexed by subsets S of $\{1, 2 \ldots N\}$. This claim will conclude the proof of Theorem 2.9.

To verify the claim, let $x, y \in R^N$ so that $M_a^G(x)=M_a^G(y)$ and yet $x \neq y$, nor $x \neq -y$. Because G contains the canonical basis of $R^N$, $|x_k|=|y_k|$ for all $1 \leq k \leq N$. Then there is a subset $S \subset \{1, 2 \ldots N\}$ so that $y_k=(-1)^{S(k)}x_k$. Note $S \neq 0$, nor $S \neq \{1, 2 \ldots N\}$. Denote $D_S$ the diagonal N×M matrix $(D_S)_{kk}=(-1)^{S(k)}$. Thus $y=D^{S^x}$ and yet $D_S \neq \pm 1$. Let $G_{k0} \in G$ so that none of its entries vanish. Then $|<x, g_{k0}>|=|<y, g_{ko}>|$ implies, $$<x, (I \pm D_S)g_{k0}>=0 \quad (2.22)$$

This proves the set $X^G$ is included into the union of $2(2^N−2)$ linear subspaces of codimension 1, $$\cup_{S \neq \emptyset, S^C \neq \emptyset}\{(I-D_S)g_{k0}\}^\perp \cup \{(I+D_S)g_{k0}\}^\perp \quad (2.23)$$

Because F is similar to G, $X^F$ is included into the image of the above set through a linear invertible map, which proves the claim.

2.5(b). Analysis for M Complex Frames

In this section the Hilbert space is $C^N$. For an M-element frame $F=\{f_1, f_2 \ldots f_M\}$ of $C^N$ the analysis operator is defined by equation (2.14), where the scalar product is $$\langle x, y \rangle = \sum_{k=1}^{N} x(k)\overline{y(k)}.$$

The range of coefficients, e.g., the range of the analysis operator, is a complex N-dimensional subspace of $C^M$ that is denoted again by W. The nonlinear map to be analyzed is given by:

$$M^{\mathcal{F}}: C^N / T^1 \to C^M: \quad M^{\mathcal{F}}(\hat{x}) = \sum_{k=1}^{M} |\langle x, f_k \rangle| e_k, \quad x \in \hat{x} \quad (2.24)$$

where two vectors $x, y \in \hat{x}$ if there is a scalar $c \in C$ with $|c|=1$ so that $y=cx$.

By the equivalence, M-frames of $C^N$ are parameterized by points of the fiber bundle F(N, M; C), and the GL(N, C) bundle over the complex Grassmanian $Gr(N, M)^C$.

Proposition 2.1 holds true for complex frames as well. Thus without loss of generality the topology induced by the base manifold of F(N, M; C) into the set of M-element frames of $C^N$ will be used. Thus, in the real case, the question about M-element frames in $C^N$ is reduced to a question about the Grassmanian of N-planes in $C^M$. First, the following theorem is proved.

Theorem 3.1. If $M \geq 4N−2$ then the generic N-plane W in $C^M$ has the property that if $v=(v_1, v_2 \ldots v_M)$ and $w=(w_1, w_2 \ldots w_M)$ are vectors in W such that $|v_i|=|w_i|$ for all i then $v=\lambda w$ for some complex number $\lambda$ of modulus 1.

Proof. Assume that an N-plane W has a property (*) if there are non-parallel vectors v, w in W such that $|v_i|=|w_i|$ for all i. Recall that two vectors x, y are parallel if there is a scalar $c \in C$ so that $y=cx$.

Given an N-plane W it may be assumed, after recording coordinates on $C^M$, that W is the span of the rows of an N×M matrix of the form:

$$\begin{bmatrix} 1 & 0 & \ldots & 0 & u_{N+1,1} & \ldots & u_{M,1} \\ 0 & 1 & \ldots & 0 & u_{N+1,2} & \ldots & u_{M,2} \\ | & | & | & | & | & & | \\ 0 & 0 & \ldots & 1 & u_{N+1,N} & \ldots & u_{M,N} \end{bmatrix} \quad (2.25)$$

where the N (M−N) entries $\{U_{i,j}\}$ are viewed as indeterminates. Thus, $Gr(N, M)^C$ is isomorphic to $C^{N(M-N)}$ in a neighborhood of W.

Now suppose that W satisfies (*) and v and w are two non-parallel vectors whose entries have the same modulus. The choice of basis for W ensures that one of the first N entries in v (and hence w) are nonzero. Because one only cares about these vectors up to rescaling, it may be assumed, after recording, that $v_1=w_1=1$. In addition, the vectors are assumed non-parallel so that it may be assumed that $v_1 \neq w_1 \neq 0$ for some $i \leq N$. After again reordering, it can be assumed that $v_2 \neq w_2 \neq 0$.

Then set $\lambda_1=1$. By assumption there are numbers $\lambda_2 \ldots \lambda_M$ with $\lambda_2 \neq 1$ such that $w_i=\lambda_i v_i$ for $1, 2 \ldots M$. Expanding in terms of the basis for W, for i>N, $$v_i = \sum_{j=1}^{N} v_j u_{i,j},$$

and $$w_i = \sum_{j=1}^{N} \lambda_j v_j u_{i,j}.$$

Thus if W satisfies (*) there must be $\lambda_2 \ldots \lambda_N \in T^1$ (with $\lambda_2 \neq 1$) and $v_2 \ldots v_N \in C$ such that for all $N+1 \leq i \leq M$ one has, $$\left|\sum_{j=1}^{N} v_j u_{i,j}\right| = \left|\sum_{j=1}^{N} \lambda_j v_j u_{i,j}\right| \quad (2.26)$$

Consider now, the variety Y of all tuples, $$(W, u_2, \ldots, u_N, \lambda_2, \ldots, \lambda_N) \quad (2.27)$$

as above. Because $v_2 \neq 0$ and $\lambda_2 \neq 1$ this variety is locally isomorphic to the real $2N(M-N)+3N-3$-dimensional variety, $$C^{N(M-N)} \times (C \setminus \{0\}) \times (C)^{N-2} \times (T^1 \setminus \{1\}) \times (T^1)^{N-2} \quad (2.28)$$

The locus in $Gr(N, M)^C$ of planes satisfying the property (*) is denoted by X. This variety is the image under projection to the first factor of Y cut out by the M–N equation (2.26) for $N+1 \leq i \leq M$. The analysis of equation (2.26) is summarized by the following result.

Lemma 3.2. The M–N equations of (2.26) are independent. Hence X is a variety of a real dimension at most $2N(M-N)+3N-3-(M-N)$.

Proof of Lemma 3.2. For any choice of $0 \neq v_2, v_3 \ldots v_N$ and $1 \neq \lambda_2, \lambda_3 \ldots \lambda_N$ the equation, $$\left|\sum_{j=1}^{M} v_j u_{i,j}\right|^2 = \left|\sum_{j=1}^{M} \lambda_j v_j u_{i,j}\right|^2 \quad (2.29)$$

is non-degenerate. Because the variables $u_{i,1} \ldots u_{i,N}$ appear in exactly one equation, these equations (for fixed $v_2, v_3 \ldots v_N$, $\lambda_2, \lambda_3 \ldots \lambda_N$) define a subspace of $C^{N(M-N)}$ of a real codimension at least M–N. Because this is true for all choices, it follows that the equations are independent.

From this Lemma, it follows that the locus of N-planes satisfying (*) has a local or real dimension $2N(M-N)+3N-3-(M-N)$. Therefore, if $3N-3-(M-N)<0$, e.g., if $M \geq 4N-2$, this locus cannot be all of $Gr(N, M)^C$, thus ending the proof of Theorem 3.1.

The main result in the complex case then follows from Theorem 3.1.

Theorem 3.3 (Complex Frames). If $M \geq 4N-2$ then $M^F$ is injective for a generic frame $F = \{f_1, f_2 \ldots f_N\}$.

Lemma 3.2 yields the following result.

Theorem 3.4. If $M \geq 2N$ then for a generic frame $F \in F|N, M; C|$ the set of vectors $x \in C^N$ such that $(M^F)^{-1}(M_a^F(x))$ has one point in $C^N/T^1$ has a dense interior in $C^N$.

Proof. From Lemma 3.2, for a generic frame the M–N equations of (2.26) in $2(N-1)$ indeterminates $(v_2 \ldots v_N, \lambda_2 \ldots \lambda_N)$ are independent. Note there are $3(N-1)$ real valued unknowns and M–N equations. Hence, the set of $\{(v_2 \ldots v_N)\}$ in $C^{N-1}$ for which there are $(\lambda_2 \ldots \lambda_N)$ such that equation (2.26) has a solution in $(C \setminus \{0\}) \times (C)^{N-2} \times (T^1 \setminus \{1\}) \times (T^1)^{N-2}$ has a real dimension at most $3(N31\ 1)-(M-N)=4N-3-M$. For $M \geq 2N$ it follows $3(N-1)-(M-N)<2(N-1)$ which shows the set of $v = (v_1 \ldots v_N)$ such that $(M^F)^{-1}(M_a^F(v))$ has more than one point is thin in $C^N$, e.g., its complement has a dense interior.

The optimal bound for the complex case is thus believed to be $4N-2$. However, as this case is different from the real case in that complex frames with only $2N-1$ elements cannot have $M^F$ injective. To show this, the proof of Theorem 2.8 (1)→(2) does not use the fact that the frames are real. So in the complex case, one has:

Proposition 3.5. If $\{f_j\}_{j \in I}$ is a complex frame and $M^F$ is injective, then for every $S \subset \{1, 2 \ldots M\}$, if $L^S \cap W \neq 0$ then $(L^S)^C \cap W$. Hence, for every such S, either $\{f_j\}_{j \in S}$ or $(f_j)_{j \in S}^C$ spans H.

Now it will be shown that complex frames must contain at least 2N-elements for $M^F$ to be injective.

Proposition 3.6 (Complex Frames). If $M^F$ is injective then $M \geq 2N$.

Proof. It is assumed that $M=2N-1$ and that in this case $M^F$ is not injective. Let $\{Z_j\}_{j=1}^{N}$ be a basis for W and let P be the orthogonal projection onto the first N-1 unit vectors in $C^M$. Then $\{PZ_j\}_{j=1}^{N}$ sits in an N-1-dimensional space and so there are complex scalars $$\{a_j\}_{j=1}^{N-1},$$

not all zero, so that $\Sigma a_j P_{Z_j} = 0$. In other words, there is a vector $0 \neq y \in W$ with support $y \subset \{N, N+1 \ldots 2N-1\}$. Similarly, there is a vector $0 \neq y \in W$ with support $x \subset \{1, 2 \ldots N\}$. If $x(N)=0$ or $y(N)=0$ we contradict Proposition 3.4. In addition, if $$x(i) = 0 \text{ for all } i < N, \text{ then } (y - cx)(N) = 0 \text{ for } c = y(N)\frac{\overline{x(N)}}{|x(N)|^2}.$$

Now, x, y–cx are in W and have disjoint support so the map is not injective. Otherwise, let, $$z = \frac{\overline{x(N)}}{|x(N)|^2}, \quad w = i\frac{\overline{y(N)}}{|y(N)|^2} \quad (2.30)$$

Now, $z, w \in W$ and $z(N)=1$ and $w(N)=i$. Hence, $|z+w|=|z-w|$. It follows that there is a complex number $|c|=1$ so that $z+w=c(z-w)$. Because $zi \neq 0$ for some $i<N$, $c=1$ and $w=0$, which is a contradiction.

Thus, in accordance with an exemplary embodiment of the present invention, by constructing new classes of Parseval frames for a Hilbert space, an original signal that includes an unknown source component and a noise component is reconstructed without using its noise component or estimation. Therefore, by using information available from the transformed domain of a signal, signal reconstruction may take place without using an estimate of signal phase.

It is to be further understood that because some of the constituent system components and method steps depicted in the accompanying figures may be implemented in software, the actual connections between the system components (or the process steps) may differ depending on the manner in which the present invention is programmed. Given the teachings of the present invention provided herein, one of ordinary skill in the art will be able to contemplate these and similar implementations or configurations of the present invention.

It should also be understood that the above description is only representative of illustrative embodiments. For the convenience of the reader, the above description has focused on a representative sample of possible embodiments, a sample that is illustrative of the principles of the invention. The description has not attempted to exhaustively enumerate all possible variations. That alternative embodiments may not have been presented for a specific portion of the invention, or that further undescribed alternatives may be available for a portion, is not to be considered a disclaimer of those alternate embodiments. Other applications and embodiments can be implemented without departing from the spirit and scope of the present invention.

It is therefore intended, that the invention not be limited to the specifically described embodiments, because numerous permutations and combinations of the above and implementations involving non-inventive substitutions for the above can be created, but the invention is to be defined in accordance with the claims that follow. It can be appreciated that many of those undescribed embodiments are within the literal scope of the following claims, and that others are equivalent.

What is claimed is:

1. A method for nonlinear signal enhancement, comprising:
   performing a linear transformation on a measured signal comprising a source component and a noise component;
   determining a modulus of the linear transformed signal;
   estimating a noise-free part of the linear transformed signal; and
   reconstructing the source component of the measured signal using the noise-free part of the linear transformed signal.

2. The method of claim 1, wherein the step of reconstructing the source component of the measured signal, comprises:
   performing a nonlinear transformation on the noise-free part of the linear transformed signal;
   determining a sign of the source component of the measured signal;
   determining a product of the nonlinear transformed signal and the sign; and
   performing an overlap-add procedure using the product of the nonlinear transformed signal and the sign.

3. The method of claim 1, wherein the linear transformation is one of a Fourier transform and a wavelet transform.

4. The method of claim 1, wherein the noise-free part of the linear transformed signal is estimated using one of a Wiener filtering technique and an Ephraim-Malah estimation technique.

5. The method of claim 1, wherein the noise-free part of the linear transformed signal is estimated by solving:

$$Y(k, \omega) = \begin{cases} |X(k,\omega)| - \sqrt{R_n(k,\omega)} & \text{if } |X(k,\omega)|^2 \geq R_n(k,\omega) \\ 0 & \text{if otherwise} \end{cases}, \text{ where}$$

$$R_n(k, \omega) = \min_{k-W \leq k' < k} R_x(k', \omega) \text{ and}$$

$$R_x(k, \omega) = (1-\beta)R_x(k-1, \omega) + \beta |X(k,\omega)|^2.$$

6. The method of claim 1, wherein the step of reconstructing the source component of the measured signal, comprises:
   defining a three layer neural network by:

$$q_k = \sigma\left(\sum_{f=1}^{F} a_{kf} Z_f + \theta_k\right), \quad 1 \leq k \leq L \text{ and}$$

$$z_m = \sigma\left(\sum_{k=1}^{L} b_{mk} q_k + \tau_m\right), \quad 1 \leq m \leq M;$$

performing a nonlinear transformation on the noise-free part of the linear transformed signal by solving:

$$u_m = z_m \sqrt{\frac{Y_1^2 + \cdots + Y_F^2}{z_1^2 + \cdots + z_M^2}};$$

determining a sign of the source component of the measured signal by solving:

$$\rho = \begin{cases} +1 & \text{if } \sum_{k=1}^{M} |x_k - |u_k||^2 \leq \sum_{k=1}^{M} |x_k + |u_k||^2 \\ -1 & \text{if otherwise} \end{cases};$$

determining a product of the nonlinear transformed signal and the sign; and
performing an overlap-add procedure using the product of the nonlinear transformed signal and the sign.

7. The method of claim 6, further comprising:
   iterating:

$$\pi^{t+1} = \pi^t - \alpha \frac{\partial}{\partial \pi} \sum_{m=1}^{M} |u_m - s_m|^2$$

until $\pi$ converges, wherein $\pi = (A, B, \theta, \tau)$.

8. The method of claim 1, wherein the noise-free part of the linear transformed signal is estimated by solving:

$$\min_{0 \leq \alpha_k < 2\pi, 2 \leq k \leq F} \sum_{k=1}^{F} |Y'_k - TU(Y'))k|^2, \quad Y' = (e^{j\alpha_k} Y_k)_{1 \leq k \leq F}, \quad \alpha_1 = 0;$$

and the step of reconstructing the source component of the measured signal, comprises:
   performing a nonlinear transformation on the noise-free part of the linear transformed signal by solving:

$z = U(Y^o), Y_k^o = e^{j\alpha_k^o} Y_k;$ determining a sign of the source component of the measured signal by solving:

$$\rho = \begin{cases} +1 & \text{if } \sum_{k=1}^{M} \left\||x_k| - |u_k|\right\|^2 \leq \sum_{k=1}^{M} \left\||x_k| + |u_k|\right\|^2 \\ -1 & \text{if otherwise;} \end{cases}$$

determining a product of the nonlinear transformed signal and the sign; and performing an overlap-add procedure using the product of the nonlinear transformed signal and the sign.

9. The method of claim 1, wherein the step of reconstructing the source component of the measured signal, comprises:
(i) setting k=0, $Y_0$=Y;
(ii) computing $z_k$=U$Y_k$;
(iii) computing W=T$z_k$;
(iv) computing $Y_0$ using:

$$Y_{k+1}(n) = Y(n)\frac{W(n)}{|W(n)|}, n = 1, 2, \ldots, F,$$

wherein if $\|Y_k - Y_{k+1}\| > \epsilon$:
incrementing k=k+1, repeating steps (i-iv); and
estimating the source component of the measured signal using $Z_k$.

10. The method of claim 1, further comprising:
outputting the reconstructed source component of the measured signal.

11. A system for nonlinear signal enhancement, comprising:
a memory device for storing a program;
a processor in communication with the memory device, the processor operative with the program to:
perform a linear transformation on a measured signal comprising a source component and a noise component;
determine a modulus of the linear transformed signal;
estimate a noise-free part of the linear transformed signal; and
reconstruct the source component of the measured signal using the noise-free part of the linear transformed signal.

12. The system of claim 11, wherein when the source component of the measured signal is reconstructed the processor is further operative with the program code to:
perform a nonlinear transformation on the noise-free part of the linear transformed signal;
determine a sign of the source component of the measured signal;
determine a product of the nonlinear transformed signal and the sign; and
perform an overlap-add procedure using the product of the nonlinear transformed signal and the sign.

13. The system of claim 11, wherein the measured signal is received using one of a microphone and a database comprising one of audio signals and image signals.

14. The method of claim 11, wherein when the source component of the measured signal is reconstructed the processor is further operative with the program code to:
define a three layer neural network by:

$$q_k = \sigma\left(\sum_{f=1}^{F} a_{kf} Z_f + \theta_k\right), 1 \leq k \leq L \text{ and}$$

$$z_m = \sigma\left(\sum_{k=1}^{L} b_{mk} q_k + \tau_m\right), 1 \leq m \leq M;$$

perform a nonlinear transformation on the noise-free part of the linear transformed signal by solving:

$$u_m = z_m \sqrt{\frac{Y_1^2 + \ldots + Y_F^2}{z_1^2 + \ldots + z_M^2}} ;$$

determine a sign of the source component of the measured signal by solving:

$$\rho = \begin{cases} +1 & \text{if } \sum_{k=1}^{M} \||x_k| - |u_k|\|^2 \leq \sum_{k=1}^{M} \||x_k| + |u_k|\|^2 \\ -1 & \text{if otherwise;} \end{cases}$$

determine a product of the nonlinear transformed signal and the sign; and
perform an overlap-add procedure using the product of the nonlinear transformed signal and the sign.

15. The method of claim 11, wherein the noise-free part of the linear transformed signal is estimated by solving:

$$\min_{0 \leq \alpha_k < 2\pi, 2 \leq k \leq F} \sum_{k=1}^{F} |Y'_k - TU(Y'))k|^2, Y' = (e^{j\alpha_k} Y_k)_{1 \leq k \leq F}, \alpha_1 = 0; \text{ and}$$

when the source component of the measured signal is reconstructed the processor is further operative with the program code to:
perform a nonlinear transformation on the noise-free part of the linear transformed signal by solving:

$z=U(Y^o), Y_k^o = e^{j\alpha_k^o} Y_k;$ determine a sign of the source component of the measured signal by solving:

$$\rho = \begin{cases} +1 & \text{if } \sum_{k=1}^{M} \||x_k| - |u_k|\|^2 \leq \sum_{k=1}^{M} \||x_k| + |u_k|\|^2 \\ -1 & \text{if otherwise;} \end{cases}$$

determine a product of the nonlinear transformed signal and the sign; and
perform an overlap-add procedure using the product of the nonlinear transformed signal and the sign.

16. The method of claim 11, wherein when the source component of the measured signal is reconstructed the processor is further operative with the program code to:
(i) set k=0, $Y_0$=Y;
(ii) compute $z_k$=U$Y_k$;
(iii) compute W=T$z_k$;
(iv) compute $Y_0$ using:

$$Y_{k+1}(n) = Y(n)\frac{W(n)}{|W(n)|}, n = 1, 2, \ldots, F,$$

wherein if $\|Y_k - Y_{k+1}\| > \epsilon$:
increment k=k+1, repeat steps (i-iv); and
estimate the source component of the measured signal using $z_k$.

17. The system of claim 11, wherein the processor is further operative with the program code to:

output the reconstructed source component of the measured signal.

18. The system of claim 17, wherein the reconstructed source component of the measured signal is output to one of a loudspeaker and an automatic speech recognition system.

19. A method for nonlinear signal enhancement, comprising:
- receiving a signal comprising a source component and a noise component;
- performing a linear transformation on the received signal;
- determining an absolute value of the linear transformed signal;
- estimating a noise-free part of the linear transformed signal;
- performing a nonlinear transformation on the noise-free part of the linear transformed signal;
- determining a sign of the source component of the received signal;
- determining a product of the nonlinear transformed signal and the sign; and
- performing an overlap-add procedure on the product of the nonlinear transformed signal and the sign to form a reconstructed signal of the source component of the received signal, wherein the reconstructed signal does not comprise the noise component of the received signal; and
- outputting the reconstructed signal.

20. The method of claim 19, wherein the received signal is one of a speech signal and an image signal.

* * * * *